US 8,528,283 B2

(12) United States Patent
Chen et al.

(10) Patent No.: US 8,528,283 B2
(45) Date of Patent: Sep. 10, 2013

(54) PIVOTING WEDGE PANEL MOUNTING ASSEMBLIES AND SYSTEMS

(75) Inventors: Su-Wen U. Chen, Portland, OR (US); Brian Hillstrom, Loretto, MN (US); Michael Damen, Rochetoirin (FR)

(73) Assignee: 3form, Inc., Salt Lake City, UT (US)

( * ) Notice: Subject to any disclaimer, the term of this patent is extended or adjusted under 35 U.S.C. 154(b) by 101 days.

(21) Appl. No.: 13/032,205

(22) Filed: Feb. 22, 2011

(65) Prior Publication Data
US 2011/0203747 A1 Aug. 25, 2011

Related U.S. Application Data

(60) Provisional application No. 61/307,725, filed on Feb. 24, 2010.

(51) Int. Cl.
*E05D 15/00* (2006.01)

(52) U.S. Cl.
USPC .......... 52/241; 52/243.1; 52/127.8; 52/582.1; 52/127.11

(58) Field of Classification Search
USPC ............... 52/241, 243.1, 582.1, 582.2, 127.6, 52/127.8, 127.9, 127.11; 16/87 R, 93 R, 16/93 D, 87 B
See application file for complete search history.

(56) References Cited

U.S. PATENT DOCUMENTS

| | | | |
|---|---|---|---|
| 3,191,244 A * | 6/1965 | Burke ........................ 52/127.9 |
| 3,457,676 A * | 7/1969 | Ziegler .......................... 49/409 |
| 3,720,026 A * | 3/1973 | Gasteiger ....................... 52/241 |
| 3,808,633 A * | 5/1974 | Lauterbach ................... 16/87 R |
| 4,277,920 A * | 7/1981 | Dixon ............................... 52/64 |
| 4,361,994 A * | 12/1982 | Carver ........................ 52/238.1 |
| 4,450,658 A * | 5/1984 | Legeai ........................ 52/126.3 |
| 4,572,694 A * | 2/1986 | Hoeksema .................... 403/187 |
| 4,693,630 A * | 9/1987 | Giovannetti .................. 403/231 |
| 4,930,931 A * | 6/1990 | Matsui .......................... 403/231 |
| 5,010,702 A * | 4/1991 | Daw et al. ........................ 52/241 |
| 5,189,758 A * | 3/1993 | Levy ........................ 16/87.4 R |
| 5,371,981 A * | 12/1994 | Bockmiller ................... 52/36.5 |
| 5,404,675 A * | 4/1995 | Schmidhauser ............... 49/409 |
| 5,480,117 A * | 1/1996 | Fleming, III ............... 248/231.9 |
| 5,603,192 A * | 2/1997 | Dickson ...................... 52/238.1 |
| 5,605,016 A * | 2/1997 | Pollard .......................... 49/506 |
| 5,613,796 A * | 3/1997 | Salice ........................ 403/409.1 |
| 6,070,919 A * | 6/2000 | Finkelstein ................... 292/111 |
| 6,079,754 A * | 6/2000 | Alexy ........................... 292/101 |
| 6,142,700 A * | 11/2000 | Grieser et al. ............... 403/286 |
| 6,145,264 A * | 11/2000 | Dallaire .................... 52/506.07 |
| 6,148,569 A * | 11/2000 | Giovannetti ............... 52/127.11 |
| 6,434,905 B1 * | 8/2002 | Sprague ......................... 52/474 |
| 6,460,218 B2 * | 10/2002 | Zingg ............................ 16/105 |
| 6,536,175 B2 * | 3/2003 | Conterno ..................... 52/489.1 |
| 6,658,904 B2 * | 12/2003 | Herbeck et al. .................. 70/63 |
| 6,837,084 B2 * | 1/2005 | Bailey et al. .................... 70/389 |
| 6,908,252 B1 * | 6/2005 | Rubano ......................... 403/231 |
| 7,168,213 B2 * | 1/2007 | Rudduck et al. ............... 52/235 |
| 7,454,867 B2 * | 11/2008 | Nicoletti ..................... 52/238.1 |
| 7,861,474 B2 * | 1/2011 | Houle et al. .................... 52/242 |
| 2007/0199272 A1 * | 8/2007 | Qing et al. .................. 52/582.1 |

(Continued)

*Primary Examiner* — Katherine Mitchell
*Assistant Examiner* — Justin Rephann
(74) *Attorney, Agent, or Firm* — Workman Nydegger

(57) ABSTRACT

A panel mounting system configured to securely mount a panel to a support structure includes a channel and a pivoting wedge assembly. The pivoting wedge assembly is configured to selectively lock a panel to the channel. In one or more implementations, the pivoting wedge assembly is configured to automatically rotate between a released position and a locked position.

12 Claims, 6 Drawing Sheets

(56) References Cited

U.S. PATENT DOCUMENTS

| | | | |
|---|---|---|---|
| 2008/0072515 A1* | 3/2008 | Huhnerbein | 52/582.2 |
| 2009/0301018 A1* | 12/2009 | Voegele, Jr. | 52/466 |
| 2010/0011687 A1* | 1/2010 | Arias | 52/235 |
| 2010/0205888 A1* | 8/2010 | Krige | 52/582.1 |
| 2011/0094162 A1* | 4/2011 | Morris et al. | 49/409 |
| 2011/0179739 A1* | 7/2011 | Konstantin | 52/582.1 |

\* cited by examiner

PIVOTING WEDGE PANEL MOUNTING ASSEMBLIES AND SYSTEMS

CROSS-REFERENCE TO RELATED APPLICATIONS

The present invention claims the benefit of priority to U.S. Provisional Application No. 61/307,725, filed Feb. 24, 2010, entitled "Channel Mounting System with Releasable Hidden Lock," the entire content of which is incorporated by reference herein.

BACKGROUND OF THE INVENTION

1. The Field of the Invention

Implementations of the present invention relate to apparatus, systems, and methods for suspending panels as partitions, displays, barriers, treatments, or other structures.

2. Discussion of the Relevant Art

Recent trends in building design involve adding to the functional and/or aesthetic characteristics of a given structure or design space by mounting one or more sets of decorative panels thereto. This is at least partly since there is sometimes more flexibility with how the given panel (or set of panels) is designed, compared with the original structure. Recent materials for panels include synthetic, polymeric resin materials, which can be formed as panels to be used as partitions, walls, barriers, treatments, décor, etc., in offices, homes, and other settings. In general, resin materials such as these are now popular compared with decorative cast or laminated glass materials, since resin materials may be manufactured to be more resilient and to have a similar transparent, translucent, or colored appearance as cast or laminated glass, but with less cost.

Designers may choose to mount panels, whether resin or otherwise, between upper and lower channels. Designers may prefer that the panels have no vertical or side supports. Designers often use panels mounted in such a configuration as partitions, sliding doors, or other structures. Unfortunately, many conventional hardware systems and options for mounting panels without vertical or side supports are designed for use with glass or other rigid panels. For example, many such systems are configured such that the panel rests upon the bottom channel or support. Because glass is a rigid material, the channel can support the panel by allowing the weight of the panel to rest upon the bottom channel without deformation.

Such conventional hardware systems, however, can fail to fully accommodate resin panels generally, as well as some of the unique challenges associated with resin panels. As alluded to earlier, many conventional mounting systems are designed to accommodate glass and other rigid materials that provide significant structural stability. In contrast to glass and other rigid materials, resin panels can be flexible. Thus, if the weight of a resin panel rests upon a bottom channel without vertical or side supports along the panel, the panel can bow or otherwise distort over time. Thus, many conventional hardware systems may not adequately support flexible resin panels or prevent them from bending, folding, or otherwise deforming over time.

Conventional panel mounting systems without vertical supports that attempt to address resin specific challenges often do not provide much flexibility in terms of mounting style or arrangement. For example, many conventional hardware systems often tend to be too large in size or too complex in configuration for efficient use without relatively complicated hardware and installation processes. These complicated processes can make assembly and disassembly of panel systems time consuming, and can often lead to panel damage.

In addition, conventional mounting hardware options often do not allow the resin panel to display its aesthetic properties adequately. In particular, conventional mounting hardware can be unsightly, too noticeable, or fail to provide an appropriate aesthetic for desired design environments. For example, conventional mounting hardware typically requires exposed fasteners or other undesired aesthetics that can detract from the appeal of the panel. The unpleasant aesthetic of some conventional mounting hardware is often magnified when used with translucent, transparent, or other panels that magnify texture, light, color, and form. Thus, conventional mounting hardware may be unappealing to designers and architects seeking to obtain a certain aesthetic by using decorative architectural panels.

Accordingly, there are a number of disadvantages in conventional panel mounting hardware and systems that can be addressed.

BRIEF SUMMARY OF THE INVENTION

One or more implementations of the present invention provide systems, methods, and apparatus configured to mount resin panels between upper and lower supports without side or vertical supports. In particular, one or more implementations provide for mounting of resin panels between upper and lower supports without requiring the weight of the panel to rest upon the lower channel. Thus, one or more implementations can prevent resin panels from bending, folding, or otherwise deforming over time.

For example, an implementation of a pivoting wedge assembly for mounting a panel to a support structure includes an outer shell configured to be positioned within a through hole of the panel. The assembly also includes an inner wedge pivotally secured at least partially within the outer shell. Additionally, the assembly includes one or more arms extending outward from the inner wedge. The inner wedge can be configured to pivot between a released position, in which the one or more arms are housed within the outer shell, and a locked positioned, in which the one or more arms extend outward of the outer shell.

Additionally, an implementation of a panel mounting system includes a channel having a first side wall, a second opposing side wall, and an opening between the first and second side walls. The system can also include a first flange extending from the first side wall into the opening. Furthermore, the system can include a second flange extending from the second side wall into the opening. Also, the system can include a pivoting wedge assembly including an inner wedge having one or more arms extending therefrom. The one or more arms can be configured to selectively engage the first and second flanges to lock the pivoting wedge assembly within the channel.

In addition to the foregoing, an implementation of a panel system includes an upper support secured to a support surface and a panel having a through hole therein. The panel system additionally includes a pivoting wedge assembly secured within the through hole of the panel. The pivoting wedge assembly includes an inner wedge having one or more arms extending therefrom. The pivoting wedge assembly is configured to pivot between a released position, in which the one or more arms are housed within the panel, and a locked positioned, in which the one or more arms extend outward of the panel.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
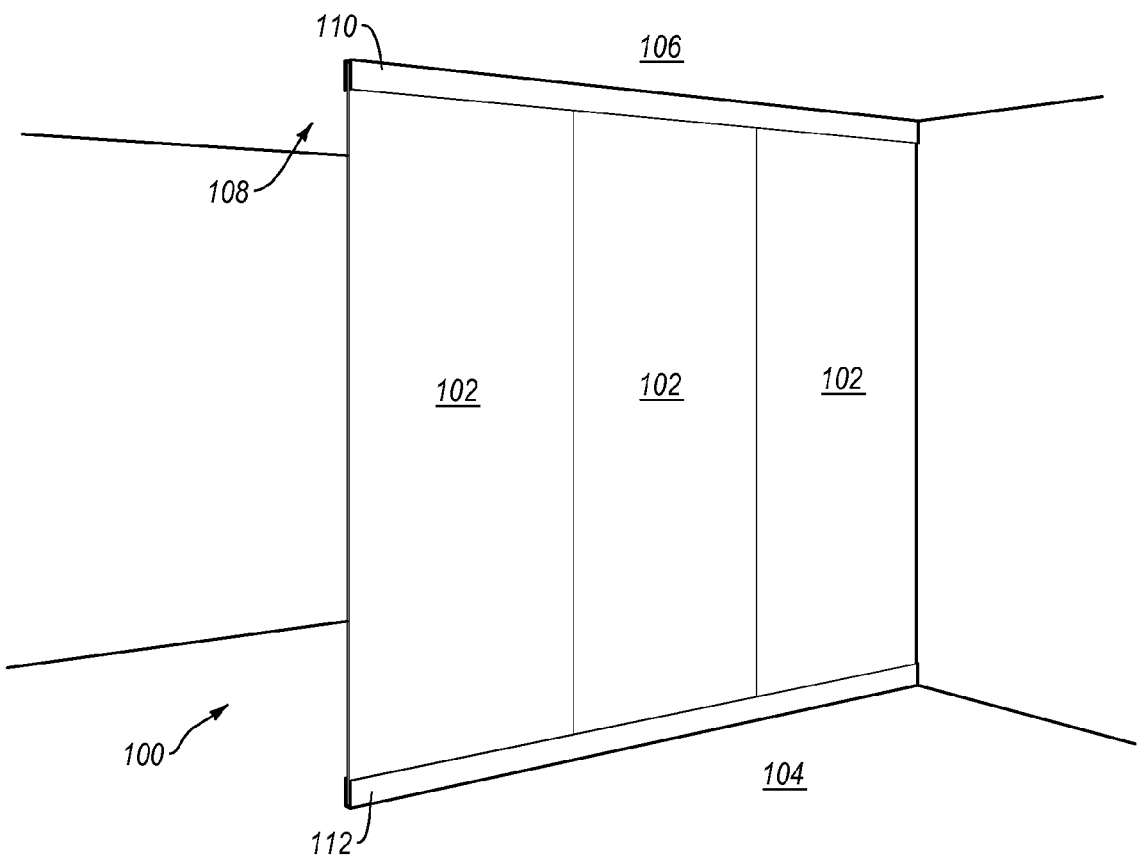
FIG. 1 illustrates a perspective view of a panel system including a plurality of panels mounted to a support structure via a panel mounting system including one or more pivoting wedge assemblies in accordance with an implementation of the present invention.

The present invention is directed toward systems, methods, and apparatus configured to mount resin panels between upper and lower supports without side or vertical supports. In particular, one or more implementations provide for mounting of resin panels between upper and lower supports without requiring the weight of the panel to rest upon the lower channel. Thus, one or more implementations can prevent resin panels from bending, folding, or otherwise deforming over time.

In addition to the foregoing, various components, systems, and methods described herein can allow a user to quickly and efficiently mount and dismount resin panels with relative ease. For instance, implementations allow a user to mount a panel to a channel simply by securing a pivoting wedge assembly within the panel, and inserting the panel into the channel. As the user inserts the pivoting wedge assembly into the channel, the pivoting wedge assembly can automatically lock within the channel.

To release the panel from the channel, a user need only slide a screwdriver, blade, or other tool between the pivoting wedge assembly and the channel, thereby disengaging the pivoting wedge assembly. The ability to quickly mount and dismount panels can allow for easy access to lighting, HVAC, or other components behind a panel for maintenance purposes or otherwise. Furthermore, one or more implementations can allow a user to quickly and easily reconfigure or otherwise change the aesthetic of a given design space by switching or otherwise reconfiguring a set of panels mounted therein.

Systems and components of the present invention can also help reduce the likelihood of damaging the panels. For instance, one or more implementations allow a user to mount a panel to a support structure by inserting the panel into a channel secured to the support structure. Thus, such implementations can eliminate the need for use of tools in close proximity to a panel during the mounting process, and thereby, reduce the likelihood of scratching the panel. Furthermore, the ability to simultaneously connect all mounting hardware can eliminate damage associated with assembling individual hardware components one at a time.

In addition to providing a secure, yet easily configurable, mount of one or more panels to a structure, one or more implementations can help magnify the aesthetic features of a mounted panel. For example, one or more implementations provide mounting systems that reduce or eliminate the visibility of hardware. Accordingly, a user can easily adapt implementations of the present invention to an environment of use and provide a number of secure mounting options.

As mentioned above, a user (architect, designer, assembler, etc.) may choose to use components of the present invention to mount resin panels because they can allow resin panels to be quickly and easily mounted with a reduced likelihood of damage, while also providing a pleasing aesthetic. As used herein, the terms "resin panel" and "resin-based panel" refer to panels comprising a substrate of one or more layers or sheets formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like.

As a preliminary matter, implementations of the present invention are described herein primarily with reference to mounting panels, such as resin panels. One will appreciate, however, that a panel, particularly a resin-based panel, is only one type of "structure" which a user may mount using the components, systems, and methods described herein can be used. For example, a user can use implementations of the present invention to mount not only resin "panels," as such, but also glass panels, to a given support structure. Furthermore, one will appreciate that a user can use various components and mounting assemblies described herein to mount other types of structures having different material compositions, such as objects comprising wood, stone, fiberglass, or the like, which may or may not exhibit primarily panel-like dimensions as described herein. Reference herein, therefore, to panels, or even resin panels, as such, is primarily for convenience in description.

For example, FIG. 1 illustrates a schematic of a panel system 100 that includes a plurality of panels 102 mounted in accordance with one or more implementations of the present invention. The panel system can include a panel mounting system 108 with pivoting wedge assemblies that secure the panels 102 to a support surface 106. As described in greater detail below, the panel mounting system 108 can include an upper support or channel 110, and one or more pivoting wedge assemblies securing each panel 102 to the upper support 110.

In one or more implementations, the panel mounting system 108 can include a bottom support that that connects the panel(s) 102 to a bottom support surface 104. For example, FIG. 1 illustrates that the panel mounting system 108 includes a bottom channel 112 spanning along the bottom edge of the panels 102. The bottom channel 112 can have a configuration similar to the upper support 110. In alternative implementations, the panel mounting system 108 may not include a bottom support 112. In such implementations, the panel(s) 102 can float above or rest directly against the bottom support surface 104.

Additionally, FIG. 1 illustrates that one or more implementations of the panel mounting system 108 can securely mount a panel 102 to a support structure 106, while at least partially concealing some or all hardware components. For example, FIG. 1 illustrates that all of the hardware (i.e., pivoting wedge assemblies) except for the upper and lower supports 110, 112 is hidden. Additionally, the panel mounting system 108 can provide an aesthetically pleasing mount without vertical or side supports, and while not causing the panels 102 to bend or otherwise distort.

Furthermore, in one or more implementations, a user can mount one or more of the upper and lower supports 110, 112 within a wall, floor, or ceiling so as to be hidden from view. Additionally, in one or more implementations, the upper and lower supports 110, 112 have a transparent or translucent configuration to reduce their visibility. In alternative implementations, the upper and lower supports 110, 112 can have a color/design corresponding with the color/design of the resin panels 102. Thus, upper and lower channels 110, 112 can blend in with the resin panels 102 and reduce their visibility.

Figure 2:
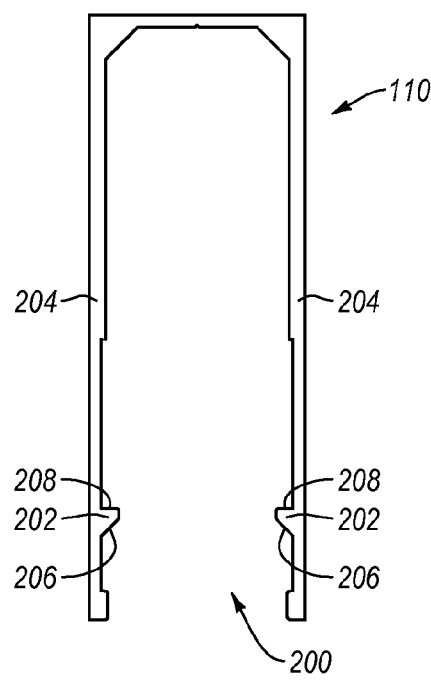
FIG. 2 illustrates an end view of a channel of the panel mounting of FIG. 1.

FIG. 2 illustrates an end view of an upper support 110. The upper support 110 can comprise an extruded channel that includes an opening 200 for receiving a portion of a panel 102 and a pivoting wedge assembly. One will appreciate that the shape of the upper support 110 and the opening 200 can comprise any number of configurations. For example, FIG. 2 illustrates that the upper support 110 can have a U-shape, and the opening 200 can have a rectangular shape. In alternative implementations, the upper support 110 can have a C or other shape. Furthermore, the shape of the upper support 110 can be dictated by one or more of the surface to which it is to be mounted and a desired aesthetic.

The upper support 110 can include various features that allow the pivoting wedge assembly to slide up within and lock itself to the upper support 110. For example, FIG. 2 illustrates that the upper support 110 can include a pair of flanges 202 extending from the outer walls 204 of the upper support 110 into the opening 200. As shown by FIG. 2, the lower portion 206 of the flanges 202 can taper gradually inward and upward.

In contrast, the upper surfaces 208 of the flanges 202 can extend generally perpendicular to the walls 204 and/or opening of the upper support 110. As explained in greater detail below, the tapered lower portion 206 of the flanges 202 and the flat upper surfaces 208 of the flanges 202 can aid in guiding and locking a pivoting wedge assembly into the upper support 110.

Figure 3:
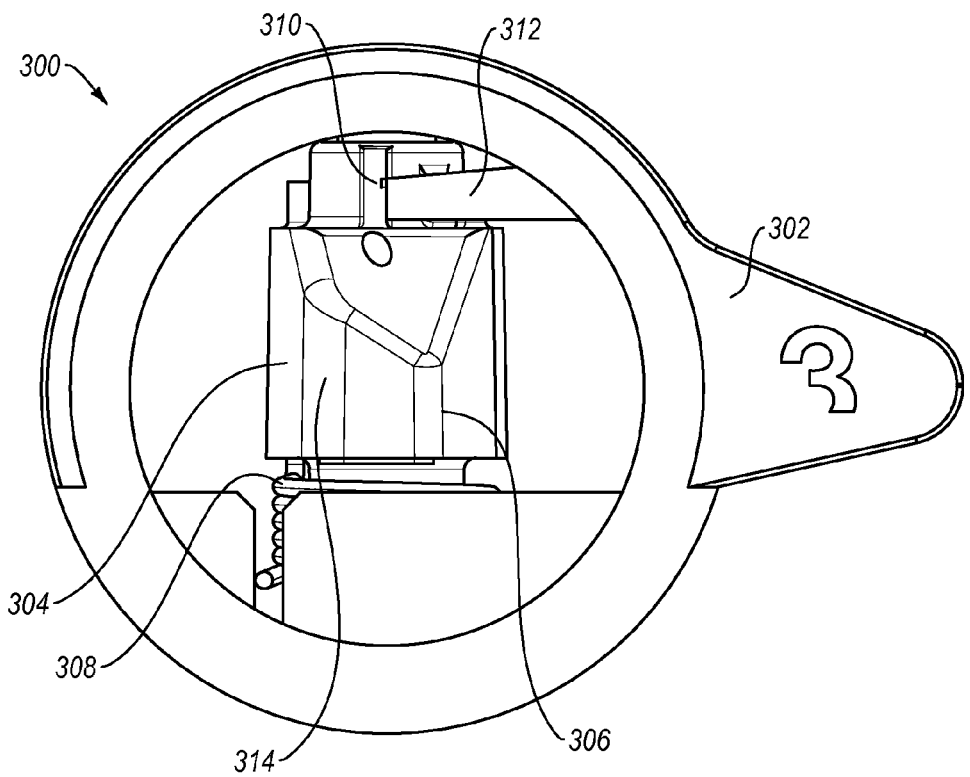
FIG. 3 illustrates a front view of a pivoting wedge assembly in a locked configuration in accordance with an implementation of the present invention.
Figure 4:
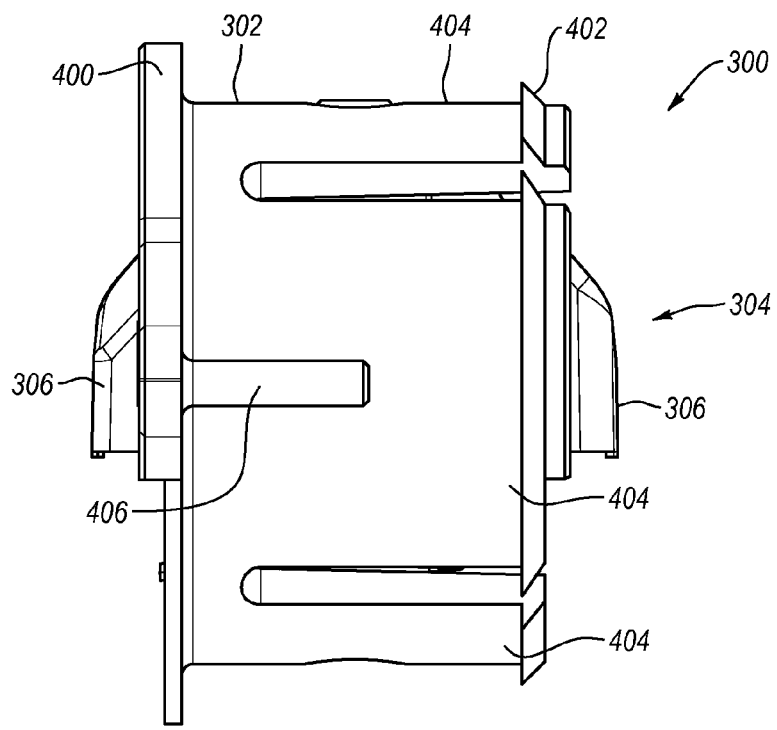
FIG. 4 illustrates a side view of the pivoting wedge assembly of FIG. 3.
Figure 5:
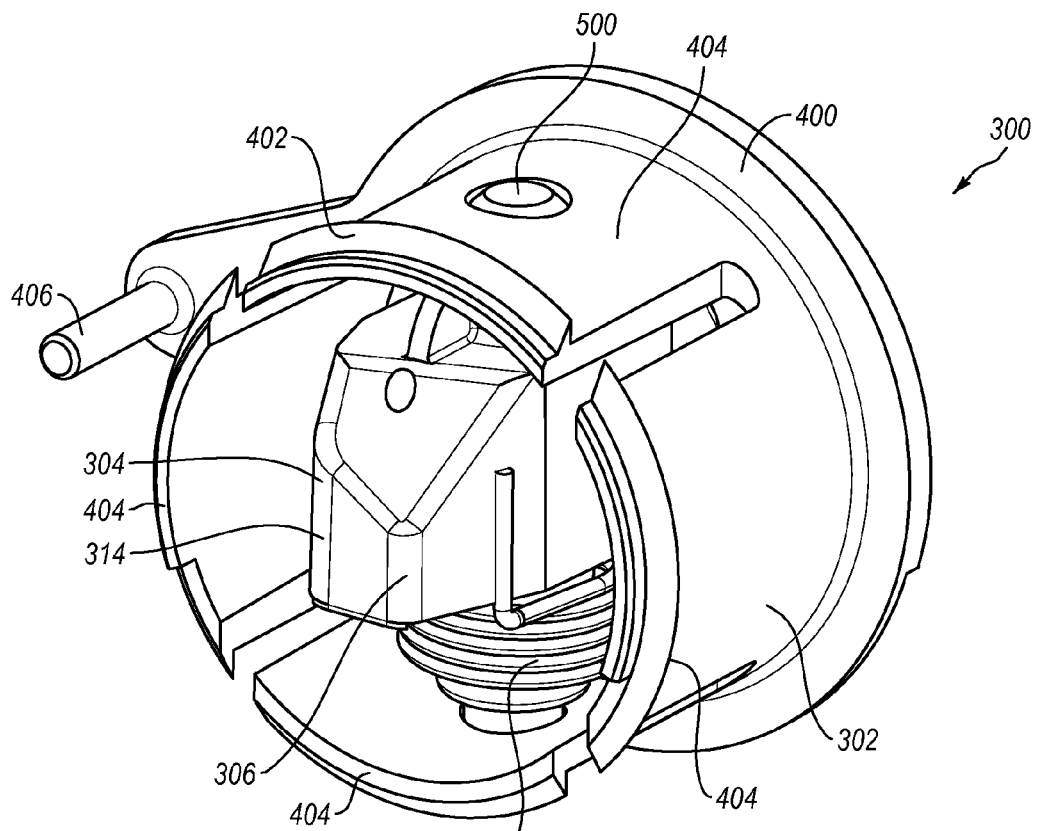
FIG. 5 illustrates a rear perspective view of the pivoting wedge assembly of FIG. 3.

Referring now to FIGS. 3-5, respectively, a front view, side view, and rear perspective view of a pivoting wedge assembly 300 in a locked position are illustrated. As shown by FIGS. 3-5, the pivoting wedge assembly 300 can include an outer shell 302 and an inner wedge 304. As explained in greater detail below, the outer shell 302 can lock the pivoting wedge assembly 300 into a through hole of a panel 102, while the inner wedge 304 can lock the pivoting wedge assembly 300 (and associated panel 102) within an upper support 110.

In particular, in one or more implementations the outer shell 302 can include various features allowing a snap-fit engagement with a corresponding through hole in a panel 102. For example, FIGS. 4 and 5 illustrate that the outer shell 302 can comprise a first lip 400 and a second lip 402. The first lip 400 can extend radially outward from a first end of the outer shell 400. The second lip 402, on the other hand, can extend radially outward from a second opposing end of the outer shell 302. The second lip 402 can extend across a plurality of segmented portions 404. The segmented portions 404 can be biased to extend outward.

The pivoting wedge assembly 300 can include at least two segmented portions 404. As shown in FIG. 5, in at least one implementation the pivoting wedge assembly 300 can include four segmented portions 404. In alternative implementations, the pivoting wedge assembly 300 can include more or less than four segmented portions.

The segmented portions 404 can allow at least a portion of the pivoting wedge assembly 300 to decrease in diameter and pass through a through hole in a panel 102. In conjunction with the segmented portions 404, the second lip 402 can include a tapered surface. The tapered surface can engage the surfaces of panel through-hole and guide the outer shell 302 into the through hole. Once the pivoting wedge assembly 300 passes through a through hole in a panel 102, the segmented portions 404 of the pivoting wedge assembly 300 can snap outward. Once the segmented portions 404 have passed through the through hole in the panel 102, the second lip 402, in combination with the first lip 400, can lock the pivoting wedge assembly 300 within the through hole of the panel 102. For instance, once within a through hole of a panel 102, the first and second lips 400, 402 can prevent the pivoting wedge assembly 300 from being pulled out of the panel 102.

Thus, in one or more implementations, the width of the outer shell 302 (i.e., distance between the first and second lips 402, 404) can correspond to the gauge or width of a panel 102 within which the pivoting wedge assembly 300 is to be mounted. In alternative implementations, the pivoting wedge assembly 300 can further include a washer or foam ring. The washer or foam ring can have a size and configuration corresponding to the diameter of the outer shell 302. Thus, a user can place the washer or foam ring on the outer shell 302 to effectively reduce the distance between the first and second lips 402, 404. Thus, the washer or foam ring can allow a user to use the pivoting wedge assembly 300 with a panel 102 having a gauge less than the width of the outer shell 302.

Additionally, the outer shell 302 can include one or more features configured to prevent the outer shell 302 from rotating relative to a panel 102 within which the pivoting wedge assembly 300 is secured. For example, FIGS. 4 and 5 illustrate that the outer shell 302 can include a pin 406. A user can drill a second hole at least partially through the panel 102 and place the pin 406 therein. Thus, the pin 406 can prevent the outer shell 302 from rotating relative to the panel 102. Alternatively, the outer shell 302 can have a square shape, and the user can form a corresponding square through hole within a panel 102. The square shapes of the outer shell 302 and the through hole can prevent the outer shell 302 from rotating relative to the panel 102. Thus, while the Figures illustrate the outer shell 302 having a generally circular cross section, the present invention is not so limited.

As previously mentioned, the pivoting wedge assembly 300 can include an inner wedge 304. The inner wedge 304 can be pivotally mounted within the outer shell 302. For example, FIG. 5 illustrates that a pivot 500 can couple the inner wedge 304 to the outer shell 302. In particular, the pivot 500 can comprise a hole formed within the outer shell 302 within which a portion of the inner wedge 304 can extend and rotate. Thus, the pivot 500 can allow the inner wedge 304 to rotate between a locked position (FIGS. 3-5 and 9C) and a released position (FIGS. 6-7 and 9B).

The inner wedge 304 can include one or more arms 306 extending outward from the inner wedge 304. For example, FIGS. 3-5 illustrate that the inner wedge 304 can have two arms 306 positioned on opposing sides of the inner wedge 304. In alternative implementations, inner wedge 304 can include three, four, six, or any number of arms 306.

Figure 6:
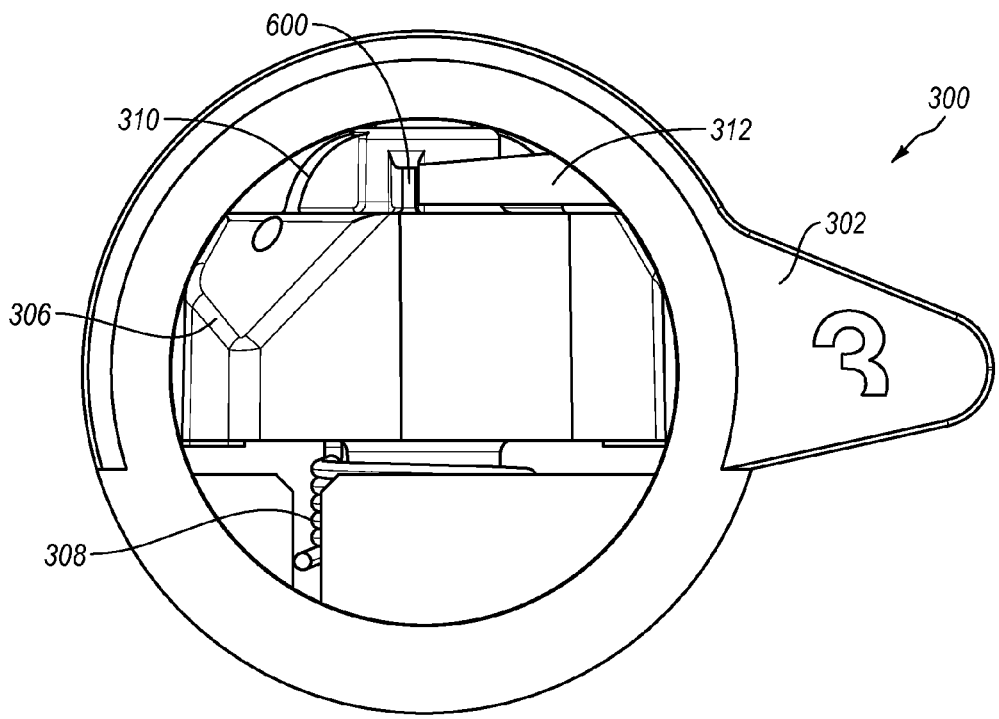
FIG. 6 illustrates a front view of the pivoting wedge assembly of FIG. 3, albeit in a released configuration.
Figure 7:
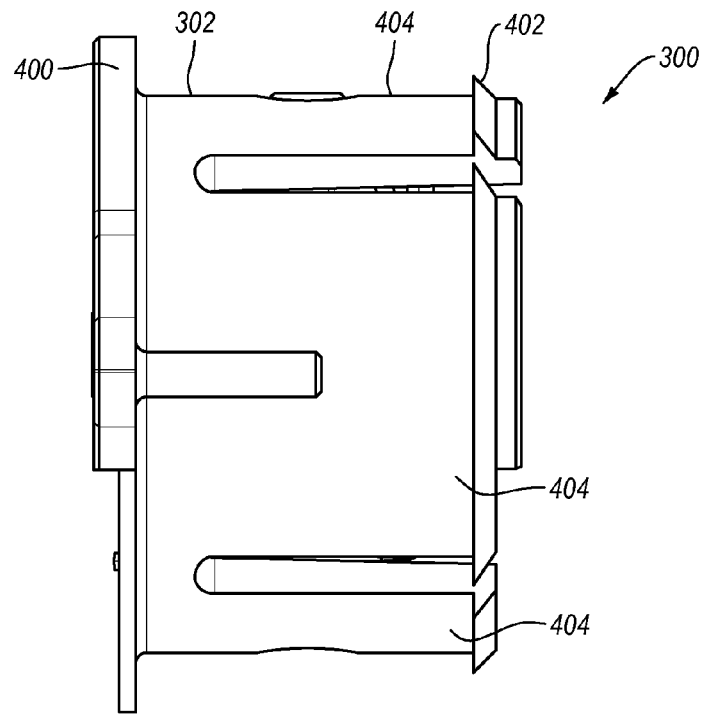
FIG. 7 illustrates a side view of the pivoting wedge assembly of FIG. 3, albeit in the released configuration.
Figure 9A:
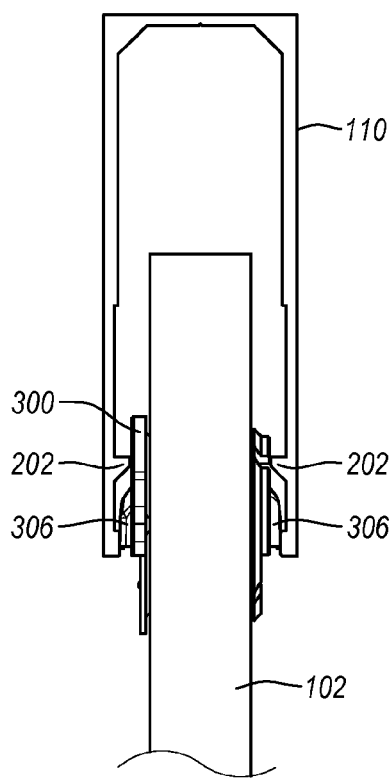
FIGS. 9A-9C illustrates an end view of the panel of FIG. 8 being inserted into the channel of FIG. 2 in accordance with an implementation of the present invention.
Figure 9B:
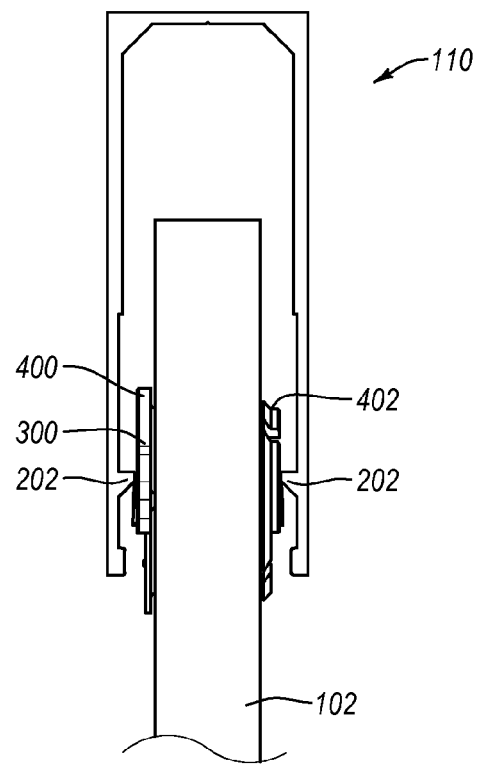
Figure 9C:
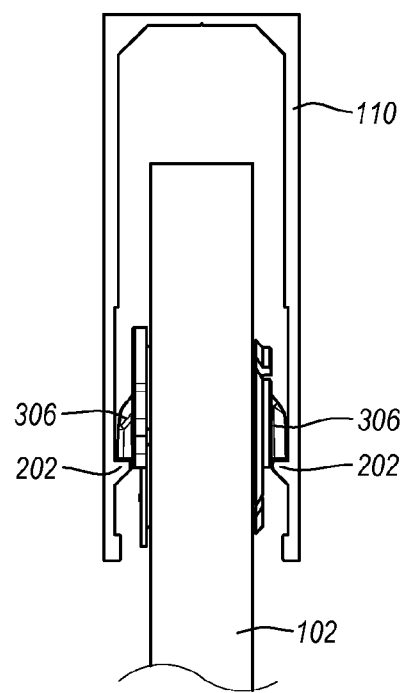

As explained in greater detail below, the inner wedge 304 can rotate or pivot between a locked position (FIGS. 3-5 and 9C) and a released position (FIGS. 6-7 and 9B). As shown by FIG. 4, when in the locked position, the arms 306 can extend beyond, or outward of, the outer shell 302. Furthermore, when positioned within a panel 102 in the locked position, as shown in FIG. 9C, the arms 306 can extend beyond, or outward of, the outer edges of the panel 102. Thus, when in the locked position, the arms 306 can engage the flanges 202 of the upper support 110 to lock the panel 102 and the pivoting wedge assembly 300 within the upper support 110.

Furthermore, the pivoting wedge assembly 300 can include a biasing mechanism that biases the inner wedge 304 in or toward the locked position. For example, as shown in FIGS. 3 and 5, in one or more implementations, the pivoting wedge assembly 300 can include a torsion spring 308 that biases the inner wedge 304 toward the locked position. To prevent the biasing mechanism 308 from rotating the inner wedge 304 beyond the locked position, the pivoting wedge assembly 300 can further include a rotation-stop mechanism. For example, FIG. 5 illustrates that the inner wedge 304 can include a protrusion 310 configured to engage a corresponding stop ridge 312 of the outer shell 302.

In addition to the forgoing features, the arms 306 of the inner wedge 304 can also include one or more features which cause the inner wedge 304 to automatically rotate into the released position when inserted into the upper support 110. In particular, the arms 306 can include one or more engagement surfaces configured to work cooperatively with corresponding features of the upper housing 110 to cause the inner wedge 304 to automatically rotate between the locked and released positions. For instance, FIGS. 4 and 5 illustrate that the arms 306 can each include surfaces 314 having a taper or cam profile.

The cam surfaces 314 can cause the inner wedge 304 to automatically rotate from the locked position into the released position as the pivoting wedge assembly 300 is inserted into the upper support 110. More specifically, the cam surfaces 314 of the arms 306 can engage the lower portion 206 of the flanges 202 of the upper support 110 (FIG. 2). As the cam surfaces 314 engage the upward and inward tapered lower portion 206 of each flange 202, the cam surfaces 314 can cause the inner wedge 304 to rotate relative to the outer shell 302 and panel 102 into the released position. In the released position, the arms 306 of the pivoting wedge assembly 300 can pass by the flanges 202. Once beyond the flanges 202, the biasing member 308 can bias the inner wedge 304 back into the locked position.

FIGS. 6 and 7 respectively illustrate front and side views of the pivoting wedge assembly 300 in the released position. When in the released position, the arms 306 can reside or be housed within the outer shell 302. In other words, as shown by FIG. 7, when in the released position the arms 306 may not extend outward of the outer shell 302. Thus, when in the released position, a user can insert or withdraw the pivoting wedge assembly 300 into or out of the upper support 110. More specifically, when the arms 306 are turned inside of the outer shell 302, the inner wedge 304 can pass by the flanges 202 of the upper support 110, as explained in greater detail below. Furthermore, as shown by FIG. 9C, when the pivoting wedge assembly 300 is mounted in a panel 102 and is in the released position, the one or more arms 306 can extend outward beyond the outer surfaces of the panel 102.

As previously mentioned, the biasing mechanism 308 can bias the inner wedge 304 toward the locked position (FIGS. 3-5). The pivoting wedge assembly 300 can include one or more features configured to retain the inner wedge 304 in the released position. In particular, the pivoting wedge assembly 300 can include a stop mechanism that selectively retains or locks the inner wedge 304 in the released position.

For example, FIG. 6 illustrates that the inner wedge 304 can include a tab 600. The tab 600 can extend outward from the inner wedge 304. When the inner wedge 304 rotates fully into the released position, the stop ridge 312 can engage the tab 600. The engagement between the stop ridge 312 and the tab 600 can prevent the biasing mechanism 308 from rotating the inner wedge 304 back into the locked position. The ability to fix the pivoting wedge assembly 300 can allow a user to easily and quickly dismount a panel 102 as explained in greater detail herein below.

Figure 8:
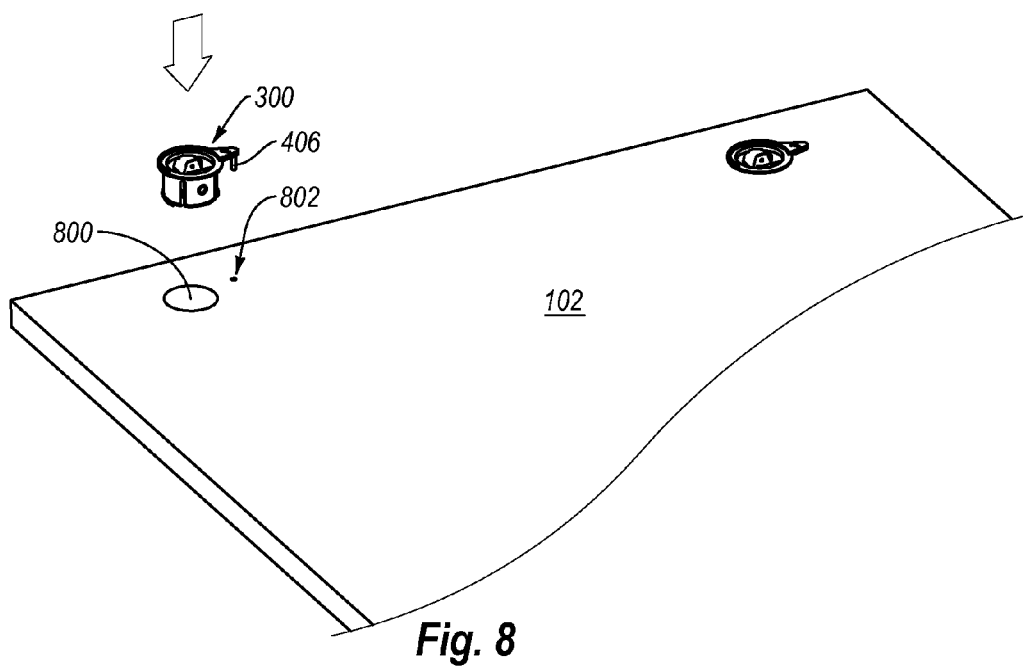
FIG. 8 illustrates a schematic view of a pivoting wedge assembly being inserted into a panel in accordance with an implementation of the present invention.

As alluded to earlier, in order to mount a panel to a support structure, a user can employ a panel mounting system 108 (FIG. 1) including one or more pivoting wedge assemblies 300. FIGS. 8-9C, and the corresponding text, show or describe in further detail the process of a user mounting a panel 102 using a panel mounting system 108 (FIG. 1) including one or more pivoting wedge assemblies 300. More specifically, FIG. 8 illustrates how a user can secure a pivoting wedge assembly 300 within a panel 102. While, FIGS. 9A-9C show how a user can insert the panel 102 and pivoting wedge assembly 300 into the upper support 110, thereby causing the inner wedge 304 to automatically rotate relative to the outer shell 302 in and out of the locked position. As described above, once in the locked position within the upper support 110, the inner wedge 304 can prevent the pivoting wedge assembly 300, and associated panel 102, from being removed from the upper support 110.

Referring now to FIG. 8, a user can form a first through hole 800 proximate the upper edge of the panel 102. The first through hole 800 can have a size and shape corresponding to the outer shell 302 of the pivoting wedge assembly 300. Thus, the first through hole can have a size and shape configured to receive the pivoting wedge assembly 300. In particular, the first through hole 800 can have a diameter approximately equal to the diameter of the outer shell 302 when the segmented portions 404 are biased into the outward position. In one or more implementations, the diameter of the first through hole 800 and the outer shell 302 can be approximately one inch.

FIG. 8 also illustrates that the user can form a second hole 802 in the panel 102. The second hole 802 can have a size and shape corresponding to the pin 406 of the pivoting wedge assembly 300. In one or more implementations, the second hole 802 may not extend completely through the panel 102. In alternative implementations, the second hole may be a through hole, and thus, extend completely through the panel 102.

As indicated by the arrow of FIG. 8, once the first through hole 800 and the second hole 802 are formed, the user can insert the pivoting wedge assembly 300 into the panel 102. In particular, the user can align the outer shell 302 with the first through hole 800, and press the outer shell into the first through hole 800. As the user urges the outer shell 302 of the pivoting wedge assembly 300 into the first through hole 800, the tapered surfaces of the tapered surface of the second lip 402 can guide the pivoting wedge assembly 300 into the first through hole 800. In particular, the walls of the first through hole 800 can engage the segmented portions 404 of the pivoting wedge assembly 300, causing the outer shell 302 to reduce in diameter. The reduced diameter of the outer shell 302 can allow the pivoting wedge assembly 300 to enter the first through hole 800.

Once the second lip 402 has completely passed by the width of the panel 102, the segmented portions 404 can automatically snap outward. At this point, the second lip 402, in combination with the first lip 400, can lock the pivoting wedge assembly 300 within the first through hole 800 of the panel 102. For instance, once within the first through hole 800, the first and second lips 400, 402 can prevent the pivoting wedge assembly 300 from being pulled out of the panel 102. In one or more implementations, the user can allow place a washer or foam ring on the outer shell 302 when the width of the outer shell 302 is greater than the gauge of the panel 102.

In addition to the foregoing, the user can align the pin 406 with the second hole 802. Thus, as the outer shell 302 enters the first through hole 800, the pin 406 can enter the second hole 802. The engagement of the pin 406 and the second hole 802 can prevent rotation of the outer shell 302 relative to the panel 102. Thus, the pin 406 can help ensure that the pivoting wedge assembly 300 is maintained in proper alignment with the panel 102, and thus, an upper support 110.

FIGS. 9A-9C illustrate views of a panel 102 and pivoting wedge assembly 300 being inserted into and locked to an upper support or channel 110 in accordance with an implementation of the present invention. In particular, FIG. 9A illustrates a panel 102 within which a user has inserted a pivoting wedge assembly 300. FIG. 9A shows that a user can insert the upper portion of the panel 102 and the pivoting wedge assembly 300 into the upper support 110 through the bottom opening of the upper support 110.

FIG. 9B illustrates as the arms 306 of the inner wedge 304 engage the flanges 202 of the upper support 110, the arms 306 can automatically rotate from the locked position (FIG. 9A) into the released position (FIG. 9B). In particular, as the arms 306 come into contact with the lower portion 206 of the flanges 206, the curvature of the cam surfaces 314 can cause the inner wedge 304 to automatically rotate from the locked position into the released position. More specifically, the cam surfaces 314 of the arms 306 can engage the lower portion 206 of the flanges 202 of the upper support 110 (FIG. 2). As the cam surfaces 314 engage the upward and inward tapered lower portion 206 of each flange 202, the cam surfaces 314 can cause the inner wedge 304 to rotate relative to the outer shell 302 and panel 102 into the released position. When in the released position, the arms 306 can reside within the outer shell 302 of the pivoting wedge assembly 300. Once the arms 306 are in the released position, the user can continue inserting arms 306 of the pivoting wedge assembly 300 past the flanges 202 of the upper support 110.

FIG. 9C illustrates that once the arms 306 have past beyond the flanges 202, the biasing mechanism 308 can cause the inner wedge 304 to rotate from the released position back into the locked position. Once fully inserted into the upper support 110 with the inner wedge 304 in the locked position, the arms 306 can engage the upper surfaces 208 of the flange 202, thereby securing or locking the pivoting wedge assembly 300 and the panel 102 within the upper support 110. Thus, the arms 306 are configured to selectively engage the first and second flanges 202 to lock the pivoting wedge assembly 300 within the channel 110.

The arms 306 of the pivoting wedge assembly 300 can support the weight of the panel 102 when the pivoting wedge assembly 300 is locked within the upper support 110. Thus, the bottom of the panel 102 may not have to support the weight of the panel 102. In other words, the panel 102 can hang from the upper support 110. Because the panel 102 hangs from the upper support, the panel 102 may not bend or otherwise deform over time due.

As shown by FIG. 9C, in one or more implementations, when the panel 102 is locked within or to the upper support 110, the upper support 110 can conceal all or part of the hardware and components used to mount the panel 102. In additional implementations, a user can secure the upper support 110 within a through hole in a ceiling or other structure in a manner that the upper support 100 is also concealed from at least a facing view of the panel 102.

One will appreciate in light of the disclosure herein that the number of pivoting wedge assemblies 300 needed to mount a panel 102 to a support structure can be at least partially dependent upon the size of the panel 102. In one or more implementations, a user may use at least two pivoting wedge assemblies 300 to mount each panel 102. Additionally, a user can space the pivoting wedge assemblies 300 to prevent the center portion of the panel 102 from shifting within the upper support 110.

The various components of one or more implementations of the present invention can simplify installation and mounting of a panel 102. For example, the pivoting wedge assembly 300 can allow a user to mount an upper support 110. Then at a later time (for example after the construction of a door frame, ceiling, or wall has been completely finished), a user can mount a panel 102 within the previously mounted upper support 110. In one implementation, for example, a user need only place two or more pivoting wedge assemblies 300 into a panel 102, and push the upper portion of the panel 102 and the two or more pivoting wedge assemblies 300 into the upper support 110.

Figure 10:
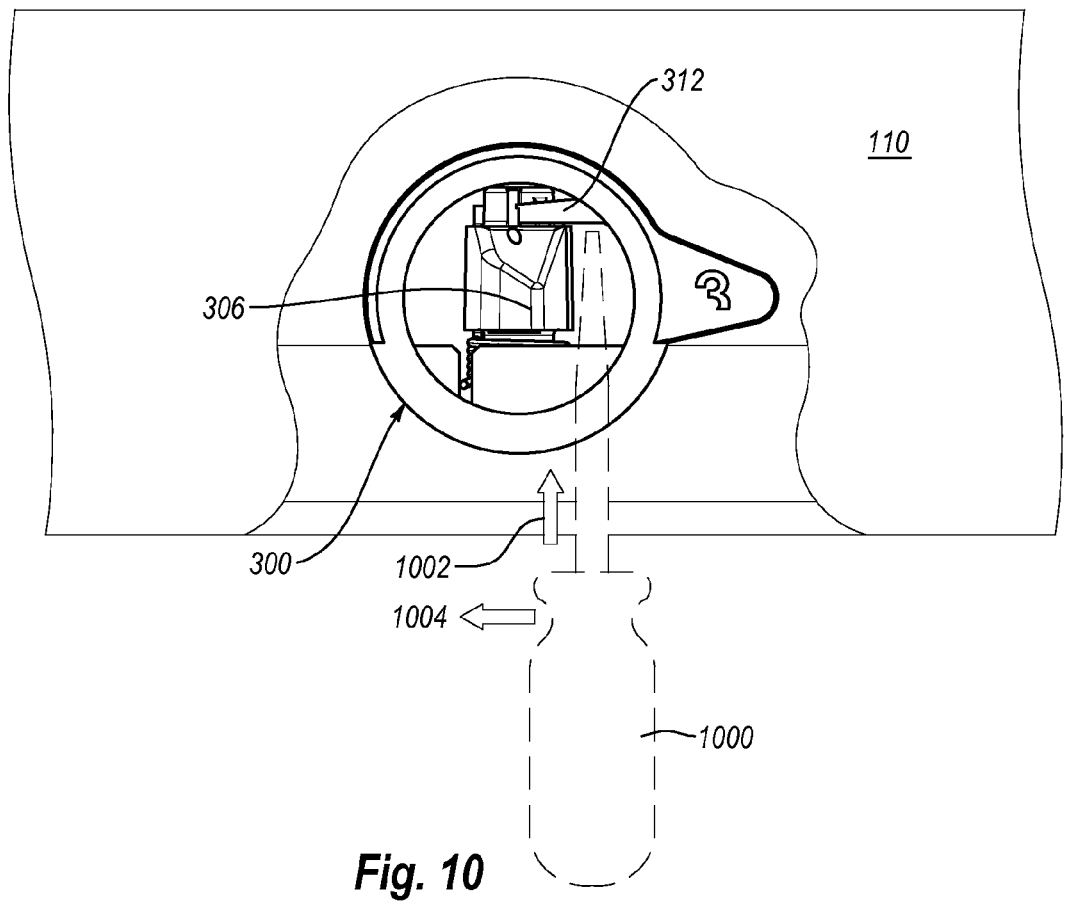
FIG. 10 illustrates a partial sectional-view of a panel mounting system in which a user inserts a tool causing the pivoting wedge to rotate from the locked position into the released position.

As previously mentioned, implementations of the present invention also can allow for quick and easy dismounting of a panel 102. FIG. 10 illustrates a method of dismounting a panel 102 from an upper support 110. In particular, FIG. 10 illustrates that to dismount a panel 102, a user can insert a small flat head screwdriver or other similar tool 1000 between the upper support 110 and the pivoting wedge assembly 300, as indicated by arrow 1002. The user can then slide the tool 1000 along the pivoting wedge assembly 300, as indicated by arrow 1004. The tool 1000 sliding across the arm 306 of the inner wedge 304 can cause the inner wedge 304 to rotate into the released position.

In implementations in which a panel 102 is secured within an upper support 110 via multiple pivoting wedge assemblies 300, each pivoting wedge assembly 300 can include a secondary lock mechanism. The secondary lock mechanism can ensure that the pivoting wedge assembly 300 remains in the released position while a user unlocks the other pivoting wedge assemblies 300. For example, once fully in the released position, the stop ridge 312 can hold or lock the inner wedge 304 in the released position, thereby, allowing the panel 102 to exit the upper support 110. To release the stop ridge 312, a user can insert the tool 1000 behind the stop ridge 312 and disengage it from the tab or pivot stop 600.

One will appreciate in light of the disclosure herein that the pivoting wedge assembly 300 allows for easy mounting and dismounting of a panel 102. In particular, the pivoting wedge assembly 300 provides for a semi-permanent partition system. For example, when the partition system is used as a room divider, the pivoting wedge assembly 300 allows a user to quickly and easily dismount the panels 102 when full use of the room is necessary, and remount them when desired, without having to remove any hardware or components from the support surface.

By way of explanation, one will appreciate that the components illustrated or otherwise described herein can comprise any number of different materials, including any number or type of sufficiently rigid synthetic or naturally occurring metals, rubber or plastic materials, and/or combinations thereof. In particular, virtually any materials of appropriate strength can be used to form or otherwise prepare the components of the panel mounting system 108, depending on the functional and/or aesthetic needs of the assembler or manufacturer. For example, in some cases, the materials are chosen not only for strength and rigidity, but also for various aesthetic concerns, including polish, degree of translucence, or ability to match coloration with a given panel, etc. In one or more implementations, the components of the pivoting wedge assembly 300 comprise a polymer material. The relative hardness of the polymer material can prevent the pivoting wedge assembly 300 from scratching or otherwise damaging a panel 102.

The present invention may thus be embodied in other specific forms without departing from its spirit or essential characteristics. The described embodiments are to be considered in all respects only as illustrative and not restrictive. For example, each of the panels shown in the Figures is planar. One will appreciate, however, that the systems and components of the present invention may be used to secure any shape or size of panel to a supports structure. Thus, a user can use the pivoting wedge assemblies of the present invention to mount a wide variety of panels to a wide variety of support structures in a wide variety of configurations. The scope of the invention is, therefore, indicated by the appended claims rather than by the foregoing description. All changes that come within the meaning and range of equivalency of the claims are to be embraced within their scope.

We claim:

1. A pivoting wedge assembly for mounting a panel to a support structure, comprising:
    an outer shell configured to be positioned within a through hole of the panel;
    an inner wedge pivotally secured at least partially within the outer shell;
    one or more arms extending outward from the inner wedge;
    wherein the inner wedge is configured to pivot between a released position in which the one or more arms are housed within the outer shell and a locked positioned in which the one or more arms extend outward of the outer shell;
    a stop mechanism configured to retain the inner wedge in the released position;
    a tab extending outward from the inner wedge; and
    a stop ridge extending from the outer shell toward the inner wedge;
    wherein the tab is configured to engage the stop ridge upon rotation of the inner wedge into the released position, thereby preventing the inner wedge from rotating back into the locked position.

2. The pivoting wedge assembly as recited in claim 1, further comprising a biasing mechanism configured to bias the inner wedge toward the locked position.

3. The pivoting wedge assembly as recited in claim 2, wherein the biasing mechanism comprises a torsion spring housed within the outer shell.

4. The pivoting wedge assembly as recited in claim 1, wherein the outer shell comprises two more segmented portions that allow a diameter of the outer shell to be reduced.

5. The pivoting wedge assembly as recited in claim 1, wherein the outer shell has a circular cross section.

6. The pivoting wedge assembly as recited in claim 1, further comprising:
    a first lip extending radially outward from a first end of the outer shell; and
    a second lip extending radially outward from a second, opposing end of the outer shell.

7. The pivoting wedge assembly as recited in claim 1, further comprising a pin configured to prevent rotation of the outer shell relative to the panel.

8. A pivoting wedge assembly for mounting a panel to a support structure, comprising:
    an outer shell configured to be positioned within a through hole of the panel;
    an inner wedge pivotally mounted within the outer shell;
    a plurality of arms extending outward from the inner wedge;
    wherein the inner wedge is configured to pivot between a released position in which the plurality of arms is housed within the outer shell, and a locked position in which the plurality of arms engages one or more flanges of an upper support to lock the panel and pivoting wedge assembly within the upper support;
    a biasing mechanism configured to bias the inner wedge toward the locked position; and
    a stop mechanism configured to prevent the biasing mechanism from rotating the inner wedge from the released position back to the locked position.

9. The pivoting wedge assembly as recited in claim 8, wherein:
    each arm of the plurality of arms includes a surface having a taper or cam profile; and
    the taper or cam profile causes the inner wedge to automatically rotate from the locked position into the released position as the pivoting wedge assembly is inserted into the upper support.

10. The pivoting wedge assembly as recited in claim 8, further comprising a pin configured to prevent rotation of the outer shell relative to the panel.

11. The pivoting wedge assembly as recited in claim 8, wherein the stop mechanism comprises a protrusion configured to engage a corresponding stop ridge of the outer shell.

12. The pivoting wedge assembly as recited in claim 8, wherein the protrusion comprises a tab that extends outward from the inner wedge.

* * * * *

UNITED STATES PATENT AND TRADEMARK OFFICE
CERTIFICATE OF CORRECTION

| | |
|---|---|
| PATENT NO. | : 8,528,283 B2 |
| APPLICATION NO. | : 13/032205 |
| DATED | : September 10, 2013 |
| INVENTOR(S) | : Chen et al. |

It is certified that error appears in the above-identified patent and that said Letters Patent is hereby corrected as shown below:

In the Specification

Column 6
Line 23, change "outer shell 400" to --outer shell 302--
Line 39, change "of panel through-hole" to --of the panel through hole--

Column 7
Line 47, change "FIG. 5" to --FIG. 3--
Line 58, change "FIGS. 4 and 5" to --FIGS. 3 and 5--

Column 8
Line 22, change "released position" to --locked position--

Column 9
Line 9, change "second hole" to --second hole 802--
Line 16, change "outer shell" to --outer shell 302--
Line 19, change "the tapered surfaces of the tapered surface of the" to --the tapered surfaces of the--
Line 34, change "allow place" to --allow or place--
Line 58, change "flanges 206" to --flanges 202--

Column 10
Line 9, change "flange 202" to --flanges 202--
Line 22, change "over time due." to --over time.--
Line 28, change "upper support 100" to --upper support 110--

Column 11
Line 2, change "position, thereby, allowing" to --position, thereby allowing--

Signed and Sealed this
Thirty-first Day of December, 2013

Margaret A. Focarino
*Commissioner for Patents of the United States Patent and Trademark Office*